United States Patent [19]

Kuckhermann

[11] 4,135,618

[45] Jan. 23, 1979

[54] CONVEYING APPARATUS

[75] Inventor: Gustav Kuckhermann, Achern, Germany

[73] Assignee: Wilhelmstal-Werke GmbH, Achern, Germany

[21] Appl. No.: 769,684

[22] Filed: Feb. 17, 1977

[30] Foreign Application Priority Data

Feb. 18, 1976 [DE] Fed. Rep. of Germany ....... 2663912

[51] Int. Cl.² .......................................... B65G 25/00
[52] U.S. Cl. ................................. 198/471; 198/489; 214/1 BC; 214/DIG. 10
[58] Field of Search ............... 198/488, 489, 490, 379, 198/803, 611, 471; 214/1 BC, DIG. 10, 1 BH, 16.1 CC, 16.1 CD, 16.1 CE, 151, 1 F; 271/248

[56] References Cited

U.S. PATENT DOCUMENTS

| 961,193 | 6/1910 | Wood ............................... 198/611 X |
| 3,258,104 | 6/1966 | Walkden ........................... 198/489 X |
| 3,746,191 | 7/1973 | Bianca .......................... 214/16.1 CC |
| 3,876,085 | 4/1975 | Bright ........................... 214/16.1 CC |
| 4,052,780 | 8/1977 | Daniels ............................. 214/1 BC |

FOREIGN PATENT DOCUMENTS 376554  7/1932  United Kingdom ..................... 271/250

*Primary Examiner*—Evon C. Blunk
*Assistant Examiner*—Douglas D. Watts
*Attorney, Agent, or Firm*—Holman & Stern

[57] ABSTRACT

Conveying apparatus, comprises at least one rotatable disc, a belt conveyor for conveying transported material substantially tangentially towards the disc, and at least one removal conveyor for conveying the transported material away from the rotatable disc, a parallel collector arranged between the rotatable disc the apparatus including and the removal conveyor and comprising at least two grab arms and associated discs swivelable about shafts orientated substantially parallel to the axis of rotation of the rotatable disc.

9 Claims, 5 Drawing Figures

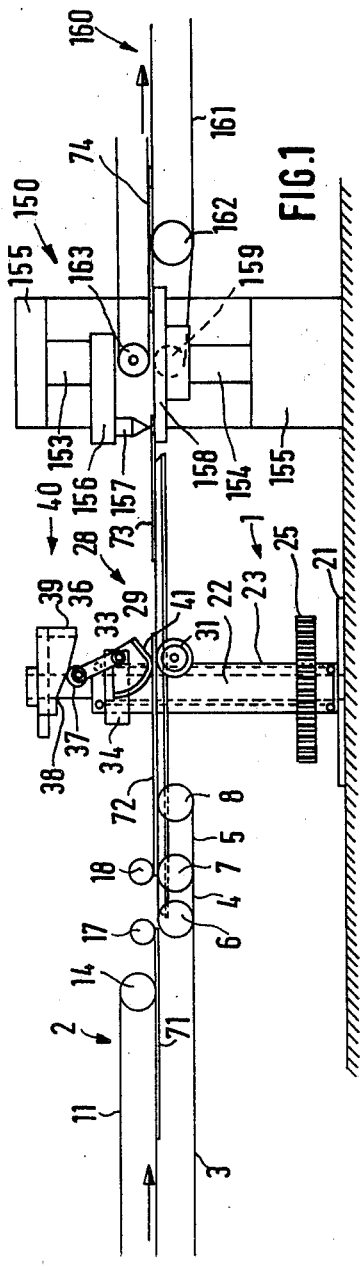
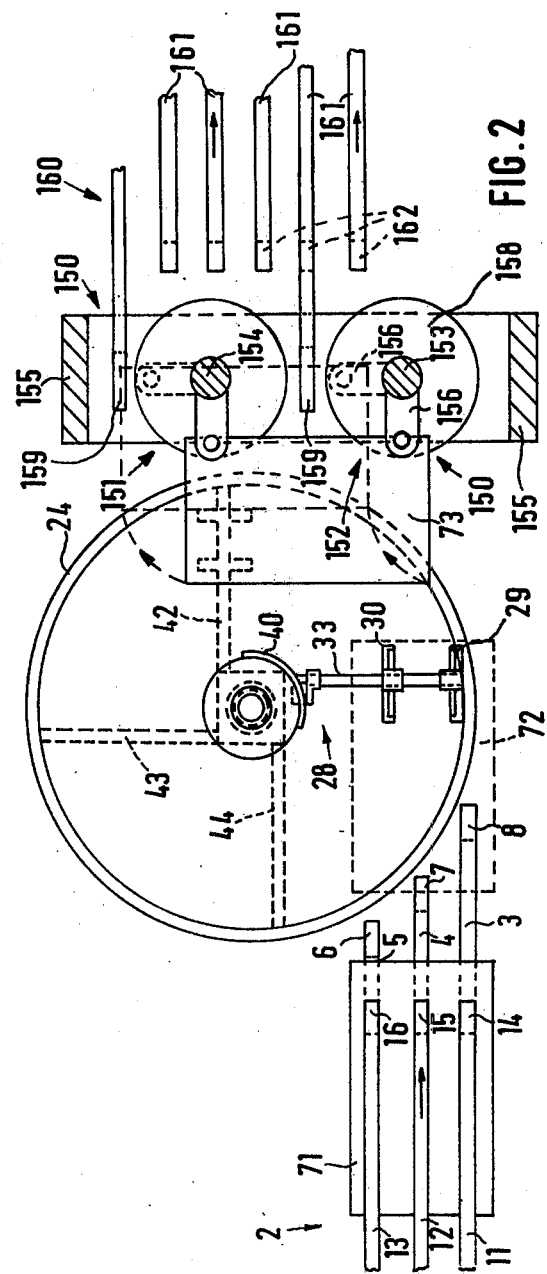

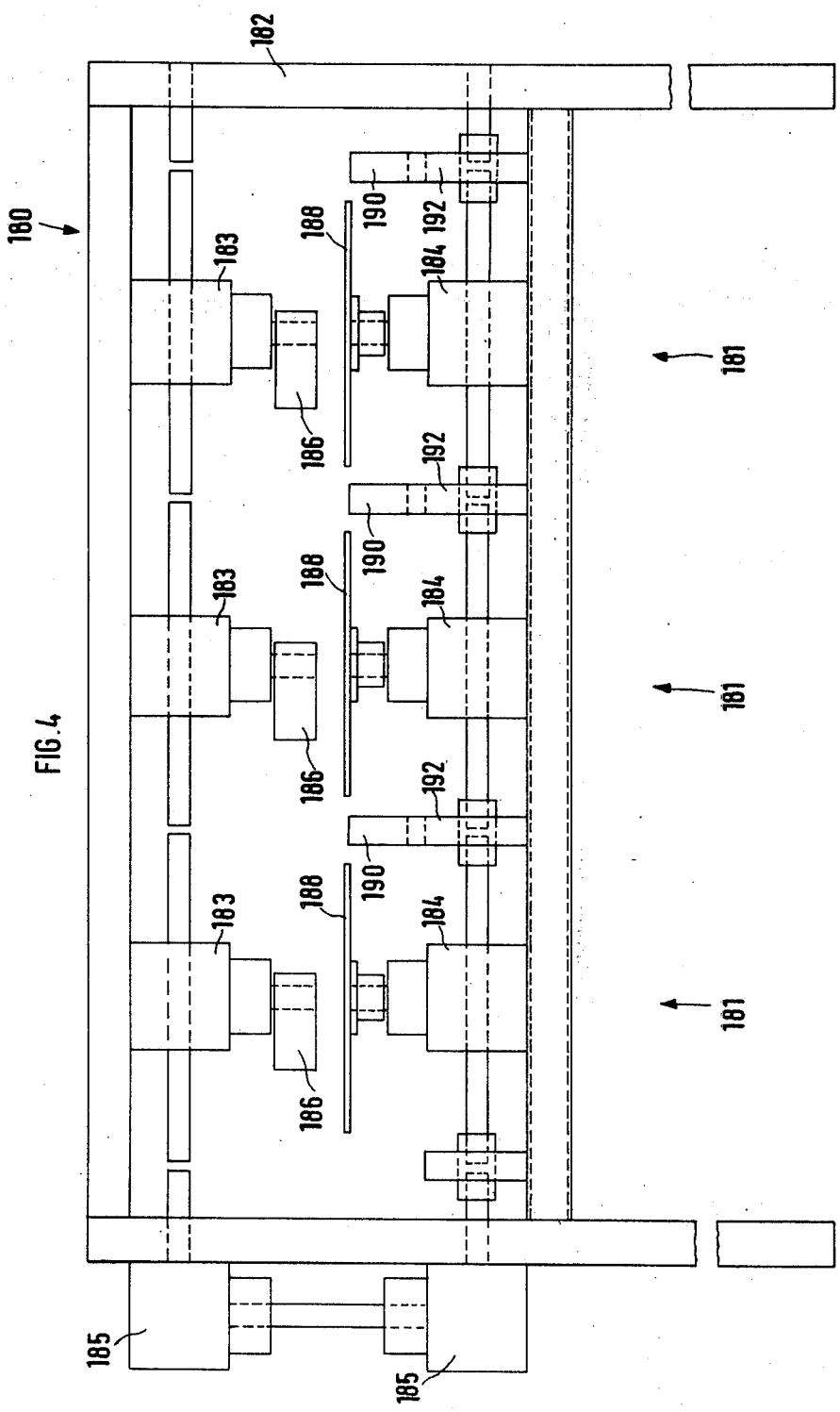

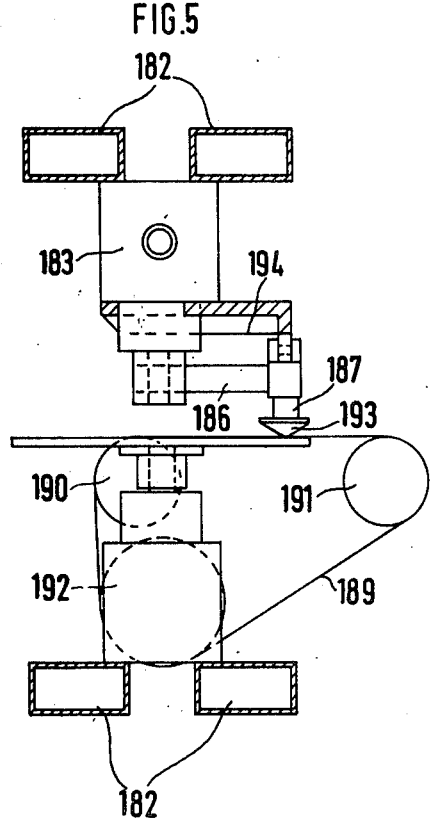
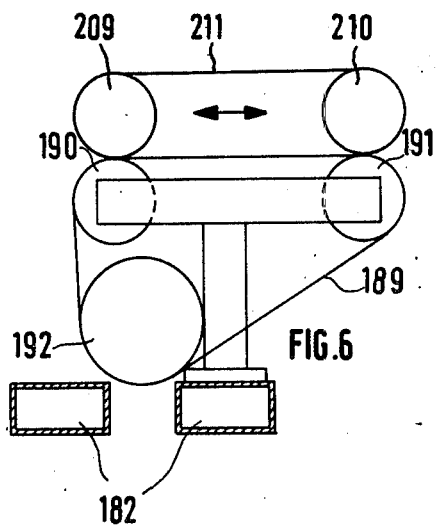
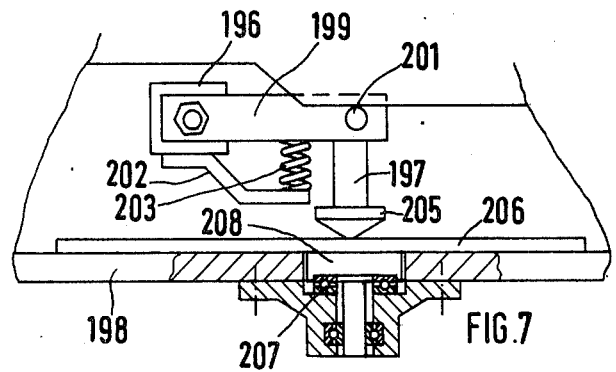

CONVEYING APPARATUS

The present invention relates to conveying apparatus, particularly but not exclusively for manufacturing paper sacks. Conveying apparatus is known comprising at least one rotatable disc, feed means for conveying transported material substantially tangentially towards the disc, and at least one removal means for conveying the transported material away from the rotating disc.

In such conveying apparatus the removal means is arranged directly on the rotating disc and approximately radially thereto. Accordingly, the transported material is removed radially from the rotating disc and thus undergoes an acceleration in a direction approximately vertical to the last direction of motion imposed by the rotational motion of the rotating disc.

It has been found that such conveying apparatus can be used in machines for manufacturing paper sacks to transport about 150 tubular pieces or similar individual units per minute. The technical development of plants for manufacturing paper sacks, as well as for other purposes, requires even more efficient and reliable conveying apparatus, which can transport more individual articles or units in a shorter time and with less errors and manipulation in corrections and repairs than hitherto.

An object of the present invention is thus to provide conveying apparatus having an increased operating rate and improved reliability.

In the above-described known conveying apparatus it has been found that the articles to be transported, in particular flexible tubular pieces in paper sack manufacture, cannot withstand an unlimited acceleration and thus limits are placed on the output potential because positive and negative accelerations or braking effects on individual articles vary with respect to one another along the conveying apparatus. A further object of the invention is to maintain accelerations of the articles being transported or even to reduce them, despite the increased transportation velocity.

The invention provides conveying apparatus comprising at least one rotatable disc, feed means for conveying transported material substantially tangentially towards said disc, and at least one removal means for conveying the transported material away from the rotatable disc, a parallel collector arranged between the rotatable disc and the removal conveyor and comprising at least two grab means swivable about shafts orientated substantially parallel to the axis of rotation of the rotatable disc.

In the known conveying apparatus every article being transported was completely decelerated on a rotating disc, i.e. was negatively accelerated, and was then withdrawn approximately radially, i.e. approximately vertically to the direction of the previous motion, by means of a withdrawing conveyor. This was necessary in order for the articles to retain their last position adopted on the rotating disc in relation to the transporting direction of the withdrawing conveyor. In contrast to this, in the conveying apparatus according to the invention, each article can now be removed approximately tangentially from the rotatable disc by means of a parallel collector inserted between the rotating disc and removal means without the position of the article changing compared with the transporting direction of the removal means.

In the transfer of the article from the rotating disc to the parallel collector and from there to the removal means, in each case the direction of movement of the article is retained. In other words, it can be said that in the conveying apparatus according to the invention, there is no "unsteadiness" or deviation in the direction of motion during the transfer of the transported article from one part of the apparatus to the next. It has surprisingly been found with the invention that high positive as well as negative accelerations can be avoided by suppressing the afore-mentioned unsteadiness.

An embodiment of the invention will now be described by way of example with reference to the accompanying drawings, in which:

FIG. 1 is a side view of conveying apparatus in accordance with the invention,

FIG. 2 is a plan view of the conveying apparatus of FIG. 1,

Figure 3:
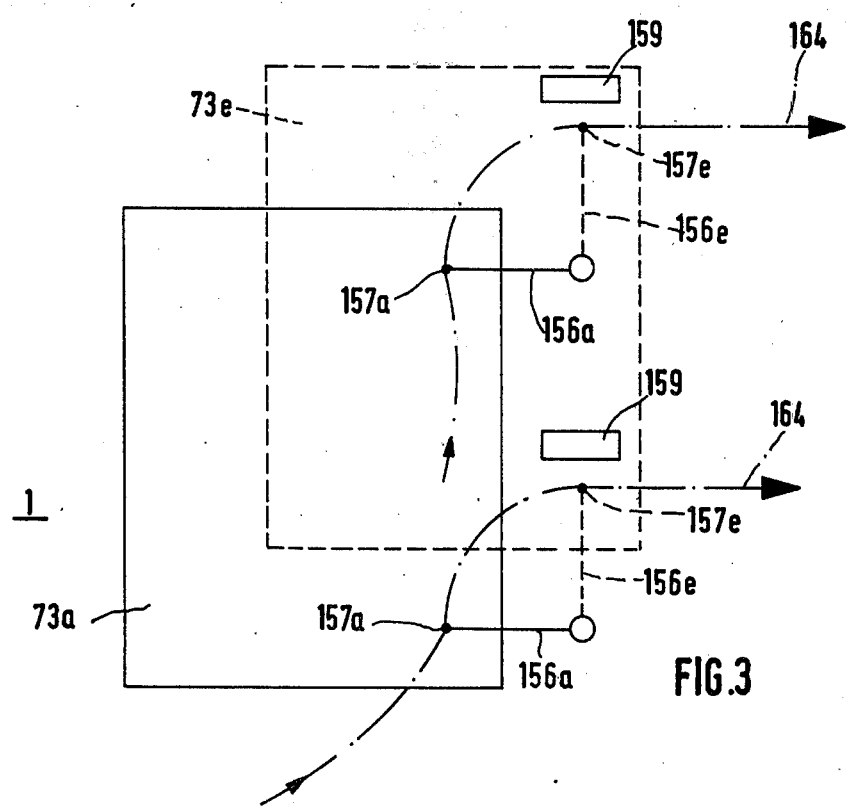

FIG. 3 is a diagrammatic sketch of the transporting movements of a flat, rectangular article, for example a flat-folded tubular piece, between the rotating disc, parallel collector, and withdrawing path section, FIG. 4 is a front view of a parallel collector with three grab means and with rollers conveying the articles away, over which rollers run the endless transporting belts, FIG. 5 is a transverse section through the parallel collector according to FIG. 4, in which however the section according to FIG. 6 is missing, FIG. 6 is a transverse section through the parallel collector according to FIG. 4, in which however the section according to FIG. 5 is missing, FIG. 7 is a cut away section of parts of a grab means with a guide disc and counter-pressure plate, grab ram and pressure head, and grab arm and controlling cam.

In FIGS. 1 and 2, a path section 2 conveying articles approximately tangentially to a rotating disc 1 comprises three parallel conveyor belts 3, 4 and 5 in the form of endless loops. These conveyor belts run at one end of the respective loop around deflecting rollers 6, 7 and 8. The necessary deflecting rollers at the other end of the loops are not shown. The conveying path section 2 also comprises counter-pressure belts 11, 12 and 13, which are also closed loops and which run at one end around coaxially arranged deflection rollers 14, 15 and 16. Thus, a counter-pressure belt is located above each conveyor belt, as can be seen in particular from FIG. 2. The spacing of counter-pressure rollers 17 and 18 (not shown in FIG. 2) from the rotating disc may be adjusted so that rollers 17, 18 hold articles to be transported on the conveyor belts and only release them when the articles are taken by the rotating disc and withdrawn from the transporting belts. The rotating disc comprises a base plate 21 and a spindle 22 secured thereto; over which spindle a hollow shaft 23 is rotatably mounted. The hollow shaft 23 carries a disc base 24 which, in operation, rotates with the hollow shaft. The means for driving the rotating disc are indicated in the form of a toothed wheel 25 at the lower end of the hollow shaft 23.

A carrier 28 on the rotating disc 1 has in particular two roller segments 29 and 30, which are located above the disc base 24. Corresponding counter-pressure rollers 31 are arranged opposite these roller segments and project at least partly through the disc base 24, and rotate freely under the drive of the roller segments 29, 30. The roller segments 29, 30 are secured to a common swivelling shaft 33, which is rotatably mounted in a collar 34. This collar is secured at the upper end of the hollow shaft 23 and in operation rotates with the hollow shaft. The disc base 24 is also rotated by the hollow shaft 23, said rotation being synchronous with the revolution of the swivelling shaft. The swivelling shaft 33 and thus the rotational axis of the roller segments 29 and 30 extends almost radially with respect to the spindle 22 and the disc base 24.

The drive for the carrier 28 has a lever 36 engaging on the swivelling shaft 33, which is operatively connected, via a free end provided with a roller 37, with striking surfaces 38 and 39 of a controlling cam 40. The controlling cam 40 is secured to the upper end of the spindle 22. The striking surface of the controlling cam has a circular ring segment shape when projected on a plane normal to the spindle, for example when projected on the plane surface of the disc base 24. In the direction of the swivelling shaft and with relation to the rotational direction of the rotating disc, the striking surface for the lever 36 forms in operation a gently rising mounting slope 38 and a sharply falling descending slope 39. The connection between the controlling cam 40 and the lever 36 means that, in operation, at periodic intervals of time once in every rotation of the rotating disc 1 the castor 37 first of all runs on the gently rising ascending slope and then runs down the sharply falling descending slope.

According to FIG. 2, the rotating disc 1 rotates in a counter-clockwise direction. in the ascending stage during operation the lever 36 is deflected downwardly about the swivelling shaft 33 and the roller segments 29 and 30 are deflected approximately tangentially in the direction of rotation of the rotating disc. During the descent of the castor 37 on the descending slope 39 the lever 36 again rises and swivels the roller segments 29 and 30 about the swivelling shaft 33 in such a way that their outer edge executes a movement against the direction of rotation of the rotating disc. If necessary, springs or linked guides or similar means, not shown, can ensure that the free end of the lever 36, i.e. the castor 37, is held on the striking surfaces 38 and 39. When the lever 36 is upright the interceptor inlets 41 of the roller segments are opposite the counter-pressure rollers 31 without contacting them, with the result that transported material can be lifted without any hindrance between the counter-pressure rollers and the roller segments 29 and 30. When the castor 37 ascends the ascending slope 38, then in operation the outer slope of each roller segment approaches the transported material and the corresponding counter-pressure roller, presses the transported material on the counter-pressure roller, and finally executes a rolling motion on the transported material.

During the execution of the rolling motion the transported material is displaced approximately tangentially forwards opposite the disc base 24 in the direction of rotation. When the castor 37 descends from the descending slope 39 of the controlling cam 40, the outer slope of each roller segment 29 and 30 executes a rolling motion on the transported material in the opposite direction, i.e. tangentially opposite the direction of rotation of the rotating disc 1, in such a way that the transported material experiences a tangentially negative or positive acceleration with reference to the direction of rotation of the rotating disc. The descending slope 39 of the controlling cam 40 should be so steep that with a constant rotational velocity of the rotating disc 1 the negative acceleration displaces the transported material approximately at a velocity which is equal to the peripheral velocity of grab means of a dependent parallel collector.

In FIG. 2 the dotted lines indicate that for example three further carriers 42, 43 and 44 may be arranged on a rotating disc 1. In the embodiments according to FIGS. 1 and 2 a single controlling cam 40 is sufficient to control several carriers. The more carriers there are arranged on the rotating disc, the smaller the peripheral velocity of the rotating disc.

A parallel collector 150 lying approximately opposite the conveying path section 2 on the rotating disc 1 has, according to the representation in FIG. 2, two grab means 151 and 152 which can swivel around grab axes arranged roughly parallel to the spindle 22 and to the hollow shaft 23 of the rotating disc. Each grab means includes two rotating shafts 153 and 154 which are mounted in a frame 155 and whose shaft frustums lie opposite one another. Each of the two grab means has a grab arm 156, a grab ram 157 and a guide plate 158. One end of the grab arm 156 is secured on the shaft frustum of the upper shaft 153. The grab ram is located at the other end of the grab arm. The guide plate 158 sits coaxially on the shaft frustum of the lower rotating shaft 154. Each of the two grab means 151 and 152 is coordinated with a carrier roller 159 whose outer periphery approaches the plane of the guide plate. Both carrier rollers have the same geometrical rotational axis, which runs approximately vertically to the grab shafts and intersects these shafts.

A path section 160 withdrawing material approximately radially from the rotating disc 1 can be built in substantially the same way as the path section 3 transporting material tangentially towards the said disc. According to the representation shown in FIG. 2, the withdrawing path section 160 has five transporting belts 161, the outer two of which run over the carrier rollers 159 and the middle three of which run over deflecting rollers 162. The withdrawing path section is therefore incorporated into the parallel collector 150 by means of the carrier rollers 159, but also can be arranged independently of the carrier rollers 159 on the parallel collectors, if for example instead of the carrier rollers two further deflection rollers, coaxial with the deflection rollers 162, were to guide the two outer transporting belts 161. According to FIG. 1, counter-pressure rollers 163 flexibly press against the carrier rollers 159, over which pressure belts, not shown and running roughly parallel to the transporting belts 161, can be led.

According to FIG. 2, flat pressed tubular pieces 71, 72, 73 and 74, preferably made of paper, pass from the cutting tool of a tube machine (not shown) between the transporting belts and counter-pressure belts of the path section 2. In the represented operating state the longitudinal axis of the tubular piece 71 is aligned directly in the transporting direction of the path section 2 from left to right so that the flat pressed open ends of the tubular piece form edges running transverse to the path. The path section 2 is arranged opposite the rotating disc 1 in such a way that in the represented operating state, the tubular piece 72 can be displaced tangentially on the disc base 24 and is released from the counter-pressure roller 18 as soon as it is grasped by the roller segments 29 and 30 of the carrier 28.

During the course of the further rotation (not shown) of the rotating disc 1 the carrier 28 displaces the tubular piece 72 tangentially further against the disc base 24 until the tubular piece 72 has reached approximately the position of the shown tubular piece 73. A short distance in front of the position which the tubular piece 72 adopts, the tubular piece 72 is again displaced tangentially backwards by the carrier 28 against the disc base 24, during the operation, with the result that in the position of the tubular piece 73 it has approximately the same velocity as the circumferential velocity of the grab ram 157 of the parallel collector 150 and can be taken from the parallel collector without any considerable acceleration of a positive or negative kind. The same explanation is valid for the previous operation, which cannot be shown, with regard to the tubular piece 73 and to the carrier 28 or the carrier 42.

The grab means 151 and 152 of the parallel collector 150 are designed and controlled so that, in the positions shown in FIGS. 1 and 2, they squeeze the tubular piece 73 being transported between their guide plate 158 and their grab ram 157. The gripping regions of the two grab means thus lie eccentrically outside the geometrical gripping axes. On synchronous rotation of the rotating shafts 153 and 154 in a clockwise direction both gripping regions on the tubular piece 73 are swivelled around corresponding rotation axes.

The swivelling movement leads to a relative rotational displacement between the grab means 151 and 152 on the one hand and the tubular piece on the other hand, of such a type that the tubular piece is withdrawn in a manner parallel to itself from the rotating disc 1 at a constant angular position, for example with reference to the withdrawing path section 160.

One end position of the grab arm 156 is shown by dotted lines in FIG. 2. In this end position the grab arms approximately have a position vertical to the fully shown, initial position. The parallel collector 150 is designed and controlled in such a way that its grab means 151 and 152 release the tubular piece in the end position and allow it to come under the action of the carrier rollers 159 and the corresponding counter-pressure rollers 163. These rollers now firmly grasp the tubular piece and convey it in a straight path in the direction of the transporting belts 161 of the withdrawing path section 160. If the counter-pressure rollers 163 are not intended to deflect pressure belts, they can be designed as roller segments whose periphery periodically approaches the carrier rollers 159 under conditions of uniform rotation. In any case, the peripheral velocity of the carrier rollers and the counter-pressure rollers 163 must be adapted to the velocity of the transporting belts 161 and any pressure belts which may be situated thereabove.

In FIG. 3 the two grab arms 156a, the two grab rams 157a, the tubular piece 73a and the carrier rollers 159 are shown diagrammatically in fully dotted lines in a starting position according to FIGS. 1 and 2. The letter a accompanying the reference numerals denotes "starting position". The end position of the same parts is shown simply by dots in a transporting path arranged according to FIGS. 1 and 2. Both reference numerals with the accompanying letters e refer to this end position. Two chain-dotted lines with arrows 164 show the path traversed by the gripping regions of the ram 157 on the tubular piece 73 during transportation by means of the rotating disc 1, parallel collector 150 and withdrawing path section 160. It can immediately be recognized that the motion imparted to the tubular piece by the parallel collector joins on without any considerable unsteadiness to the motion imparted through the rotating disc, and that the same goes for the transfer from the parallel collector to the withdrawing path section. Referred to the centre of gravity of the tubular piece, the movements imparted to the tubular piece by the rotating disc, parallel collector, carrier rollers and withdrawing path section pass from one another at least approximately tangentially. Corresponding to the invention, the best operating conditions are provided by a tangential transfer of the movements.

Obviously the movements of the grab arms and guide plates must be accurately synchronised with one another. From the overall function of the transporting path it follows that there must also be a synchronisation between the rotating disc 1 and the parallel collector 150, and similarly between the parallel collector and the withdrawing path section 160. Such synchronisation can for example be obtained by means of electrical or electronic elements. However, purely mechanical drive parts with drive belts, drive shaft and toothed drives are preferably used for synchronisation.

It would of course be possible to carry out the invention by causing the grab arms 156 to swivel back and forth in the ninety degree segment between the starting and end positions. However, drive means are preferred which cause the grab arms to continuously rotate in a full circular arc and also cause the guide plate 158 to continuously rotate at the same velocity. It is also within the scope of invention to provide more than only one grab arm 156 and grab ram 157 for a guide plate 158 and, in each case, to transport two or more tubular pieces from the upper and lower rotating shafts 153 and 154, with a complete revolution.

In the embodiment according to FIGS. 1 to 3, the grab arms 156 are the same length, lie approximately parallel to one another, are swivelled with the same angular velocity around their corresponding grab axes by drive means, and are in operative combination with the tubular piece in a swivelling range of about 90 degrees. None of these conditions, namely the same length, the same angular velocity and the swivelling range of 90 degrees between a starting position and an end position is absolutely necessary to carry out the invention; they are simply to effect, but are not necessary for, the tangential transfer of the movements of the centre of gravity of an article being transported in the transfer from the rotating disc to the parallel collector and from the latter to the withdrawing path section. If grab arms of different lengths are swivelled at the same angular velocity, the article being transported is unable to maintain its angular position from the rotating disc and experience a rotation around its centre of gravity. This rotation may be desired, if for example the withdrawing path section is intended to run other than shown in FIGS. 1 and 2. The same problem could not be solved with grab arms of the same length and unequal angular velocity. Of course, there are evident difficulties of another kind in connection with such a solution. A swivelling range of more or less than 90 degrees is preferably chosen if the withdrawing path section is intended to run other than shown in FIGS. 1 and 2 with respect to the path section conveying articles to the disc and the rotating disc itself.

With the parallel collector not only can the totality of the accelerations be reduced and/or the transporting velocity be increased but also, under certain circumstances, the angular position of the articles can be influenced and produce diversions from the rotating disc, which were not possible hitherto.

A parallel collector 180 with three grab means 181 is shown in FIGS. 4 to 6. The grab means are maintained by a frame 182 having a box-like outline. Three bevel-gear drives 183 are arranged hanging on an upper crosspiece, opposite which are arranged three bevel-gear drives 184 on a lower cross-piece of the frame. The bevel-gear drives arranged opposite one another each have coaxial output shafts and belong to one of the grab means 181. Two further bevel-gear drive means 185 and corresponding shafts produce a synchronised connection between the gears of the grab means and serve as an overall drive. The gears can be replaced by gears of another type.

A grab arm 186 is in each case secured on one side at the ends of the output shafts of the upper drive 183. Each grab arm has a bearing bush at its free end, in which is located a grab ram 187. Each grab ram can move vertically backwards and forwards in its bearing bush and is urged by a coil spring (not shown) in the direction of an upper end position. Guide plates 188 are arranged on the ends of the output shafts of the lower drive 184. Endless transporting belts 189 run between the guide plates and approximately at the height of their bearing surfaces, the said belts being in each case passed over to guide rollers 190 and 191 and over a drive roller 192. The drive rollers sit tightly on those shafts which connect the lower gears 184 of the grab means 181 to one another. A pressure head 193 made of a material having a high coefficient of friction, such as for example rubber or another material having a rough surface, is located at the lower end of the grab ram 187. A controlling cam 194 runs along the lower edge of a bell which is cut out where it is not required for the controlling cam, and of which one is flange-mounted on each of the upper gears 183. Depending on the path of the controlling cam, the lower edge of the bell projects into a slit of the bearing bush arranged on the grab arm 186 and presses directly on the upper end of the grab ram 187. In the operating position according to FIG. 5 the grab ram is in a lower end position with its pressing head 193 contacting the guide plate 188, and is in one case under the pressure of the coil spring (not shown) and in the other case under the pressure of the bell with controlling cam 194. At least when there is an article between the pressure head and the guide plate, pressures are exerted in the indicated operating position by the plate via the article and the pressure head, on to the ram. Bearing in mind any possible differences in thickness of articles, the distance between the lower edge of the bell with controlling cam 194 on the one hand, and the guide plate 188 on the other hand, is conveniently adjustably set. If the pressure head contains an elastic material, this can also contribute to equalizing varying thicknesses of articles. This compensation should otherwise be effected by means of another elastic pressure member between the ram and controlling cam.

All components 181 to 194 are of course not shown together in any of the three FIGS. 4, 5 and 6. Such an overall representation would make the Figures unnecessarily complicated. The arrangement of the individual parts with respect to one another follows unambiguously from the references of the preceding Figures to the relevant views, and bearing in mind the fact that in FIG. 5 the grab arm 186 is shown swivelled by 90 degrees compared with the grab arms in FIG. 4.

If one of the gears 185 is engaged with a uniformly rotating drive motor, the guide plates 188 rotate uniformly and synchronously with respect to one another and synchronously with respect to the grab arms 186, which are swivelled in a complete circle. The grab rams 187 with their pressure heads 193 thus remain, in the rotation movement, always above the same point of the guide plate 188 lying thereunder. The angular position of the bells with controlling cams 194 determines at what position during the rotation and swivelling articles are grasped between the pressure heads and guide plates. The length of the controlling cams running at the same spacing from the output shafts of the gears 183 determines the length of the transportation pathway up to that point at which the article is again released by the pressure heads. In any case, the pressure heads will release the article if they are in the vicinity of the corresponding transporting belts, which then take over the said article and withdraw it from the guide plates.

It is advantageous to rotatably mount counter-pressure plates 195 directly below the pressure heads 193 and coaxial thereto in the guide plates 188, the bearing surfaces of said counter-pressure plates lying roughly in the plate surface. The counter-pressure plates shown, not in detail, in FIGS. 4 to 6 have the object of preventing any distortion of transported articles on the guide plates. The construction of the counter-pressure plates is shown for example in FIG. 7.

In a modified embodiment according to FIG. 7 a grab arm 196 holds a grab ram 197 at its free end in an articulated manner over a guide plate 198. The articulated connection between the grab arm and grab ram forms a guide arm 199 mounted in a unilaterally rotatable manner on the grab arm, the grab ram being fixed or arranged with limited movement on the free end of said guide arm 199. A peg-shaped key arm 201 is also located at the free end of the guide arm. A coil spring 103 supported on a bracket 102 presses the guide arm upwardly so that the key arm 201 rests on a controlling cam. This controlling cam is again preferably a feature of a bell according to FIG. 5.

A pressure head 205 having a conical or slightly elliptical elastic tip is located at the lower end of the grab ram 197. If the friction between the pressure head and the article 106 is to be reduced, the pressure head is rotatably mounted on the grab ram 197. Of course, such a procedure only achieves its purpose if the friction in the rotation mounting for the pressure head is smaller than the friction at the tip of the pressure head.

A rotation mounting 107 is flange-mounted on the lower side of the guide plate 198, into which projects the guide peg of a round counter-pressure plate 108. The counter-pressure plate is embedded directly beneath the pressure head 105 in the guide plate and serves to reduce frictional forces between an article 106 and said guide plate. The counter-pressure plate could also be rotatably mounted independently of the guide plate on a counter arm corresponding to the grab arm 196. In this case, not shown, the guide plate would only have the task of maintaining flat flexible objects, such as for example tube pieces in paper sack manufacture, in a flat state during their path through the parallel collector. In certain cases the guide plate could even be dispensed with completely.

With reference to FIG. 6, it can be seen that a counter-pressure device can also be associated with the transporting belts 189, which presses the material being transported against the transporting belts and maintains the frictional connection with said material. The counter-pressure device has for example a grab roller 209, a deflection roller 210 and a counter-pressure belt 211 over each of the transporting belts 189. The three said components are combined to form a single unit which can be displaced along the corresponding transporting belt in the direction of the arrow with the result that the grab roller 209 can be brought to a specific distance from the end position of the nearest grab ram 187. The distance is determined for example by the width of flat tube pieces and, of course, so that such a tube piece can be directly gripped between the transporting belts 189 and associated grab rollers 209 if the grab ram discontinues its action. In certain circumstances grab rollers 209 without counter-pressure belts 211 and deflection rollers 210 are sufficient for this gripping effect on the material.

I claim:

1. Conveying apparatus, comprising at least one rotatable disc, feed means for conveying transported material substantially tangentially towards said disc, at least one removal means for conveying the transported material away from said disc, a parallel collector arranged between said disc and said removal means, said parallel collector comprising at least two grab means, each grab means comprising an upper gripping member and a lower gripping member coplanar with said disc, grab shifts about which said grab means are swivelable, said grab shafts being orientated substantially parallel to the axis of rotation of said disc and drive means for swivelling said grab means about said shafts in synchronization between a first position in which the grab means receive an article from said disc and a second position in which the grab means delivers said article to the removal means.

2. Conveying apparatus according to claim 1, wherein said grab shafts lie substantially in a common plane, and said grab means having the same angular position with respect to said common plane.

3. Conveying apparatus according to claim 2, wherein said common plane is substantially at right angles to the direction of feed of said feed means.

4. Conveying apparatus according to claim 2, wherein said drive means for swivelling the grab means is formed to rotate said grab means in a full circular arc.

5. Conveying apparatus according to claim 1, wherein said lower gripping member of each grab means comprises a guide plate rotatably mounted on the respective grab shaft and a counter pressure plate rotatably mounted in the guide plate and said upper gripping member comprises at least one grab arm which at one end is coaxially rotatably mounted on a respective grab shaft and at its other end carries a grab arm, said grab arm ram lying opposite said counter-pressure plate, a pressure head carried by said grab ram, and synchronising means interconnecting said grab arm and guide plate.

6. Conveying apparatus according to claim 5, wherein said grab ram is movably arranged in the grab arm substantially parallel to the grab axis and is connected to control means for automatically pressing the ram, pressure head and transported article on to the counter-pressure plate and the guide plate in a starting position and operating position and to raise the pressure head and the ram from said transported article in an end position.

7. Conveying apparatus according to claim 6, wherein the control means comprises a controlling cam substantially uniformly spaced from the grab shaft, said cam being connected to the grab arm.

8. Conveying apparatus according to claim 7, further comprising elastic tension members for counteracting the effect of the controlling cam on the grab arm.

9. Conveying apparatus according to claim 1, wherein grab shafts of the grab means each have the same loading.

* * * * *